United States Patent [19]

Bacsanyi et al.

[11] E Re. 31,120

[45] Reissued Jan. 11, 1983

[54] IMBALANCE DETERMINING APPARATUS AND METHOD

[75] Inventors: Thomas J. Bacsanyi, Novi, Mich.; Edward J. Harmon, deceased, late of Wixom, Mich., by Patricia Harmon, joint personal representative; by National Bank of Detroit, joint personal representative, Detroit, Mich.

[73] Assignee: Ransburg Corporation, Indianapolis, Ind.

[21] Appl. No.: 65,967

[22] Filed: Aug. 13, 1979

Related U.S. Patent Documents

Reissue of:

[64] Patent No.: 4,060,003
Issued: Nov. 29, 1977
Appl. No.: 733,433
Filed: Oct. 18, 1976

[51] Int. Cl.[3] ..... G01M 1/08

[52] U.S. Cl. ..... 73/483

[58] Field of Search ..... 73/483–487, 73/65, 66

[56] References Cited

U.S. PATENT DOCUMENTS

| | | | |
|---|---|---|---|
| 2,613,071 | 10/1952 | Hansel | 73/490 |
| 2,947,175 | 8/1960 | King et al. | 73/483 |
| 2,979,958 | 4/1961 | Kennedy | 73/483 |
| 3,038,343 | 6/1962 | Deist | 73/483 |
| 3,159,035 | 12/1964 | Mueller et al. | 73/483 |
| 3,188,869 | 6/1965 | Lash | 73/483 |
| 4,063,462 | 12/1977 | Himmler | 73/483 |

FOREIGN PATENT DOCUMENTS

| | | | |
|---|---|---|---|
| 1648510 | 8/1973 | Fed. Rep. of Germany | 73/483 |

*Primary Examiner*—James J. Gill
*Attorney, Agent, or Firm*—Jenkins, Coffey, Hyland, Badger & Conard

[57] ABSTRACT

Apparatus for determining the amount and location of imbalance in an article which is to be balanced about its axis includes a table for receiving the article and for positioning its axis. The table is supported upon a base for substantially free tilting movement generally about a point on a vertically extending axis defined by the base. A number of proximity transducers for sensing the orientation of the table relative to the base are provided. A pair of force coils positioned in quadrature about the axis between the base and the table are responsive to the proximity transducers to apply forces between the table and the base to bring the table and the article which rests thereon into a substantially neutral orientation with respect to the base. The method of the present invention comprises the steps of placing the article on the table with the article axis at a predetermined position thereon. Forces are then applied to the table at one or more predetermined locations to bring the table and the article positioned thereon into a neutral orientation. The amount and location of the applied force are determined to ascertain the amount and location of imbalance existing in the article.

12 Claims, 10 Drawing Figures

FIG. 2
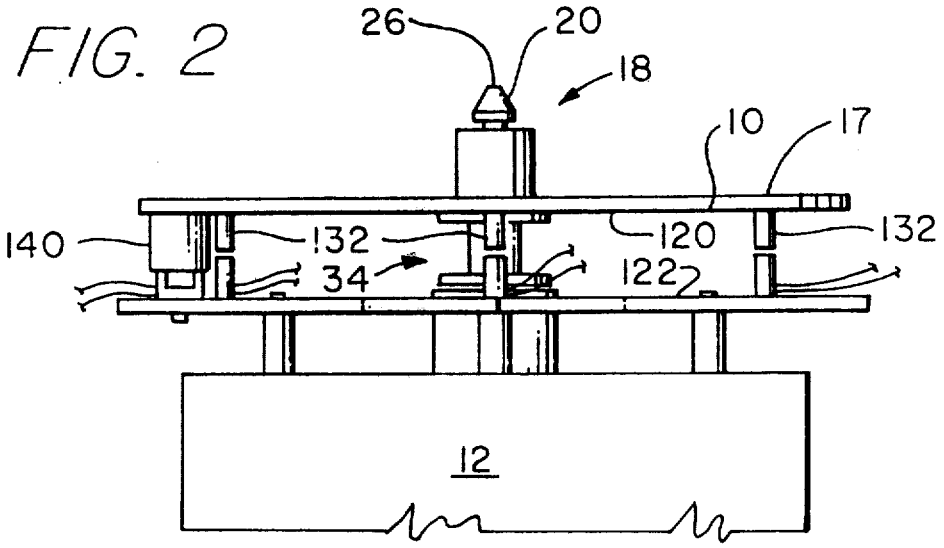
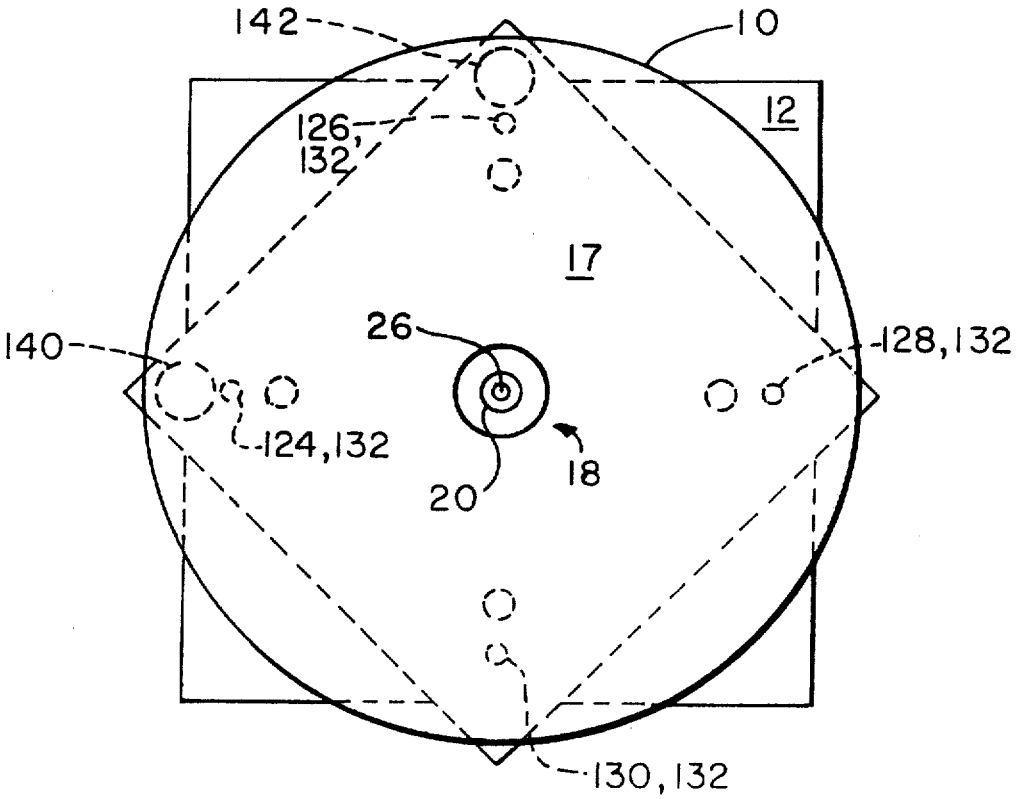
FIG. 3

FIG. 4a
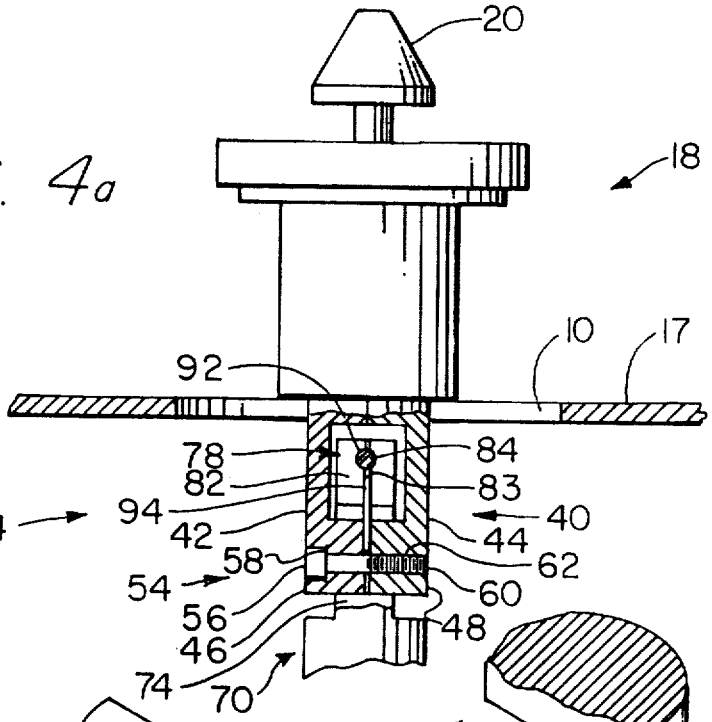
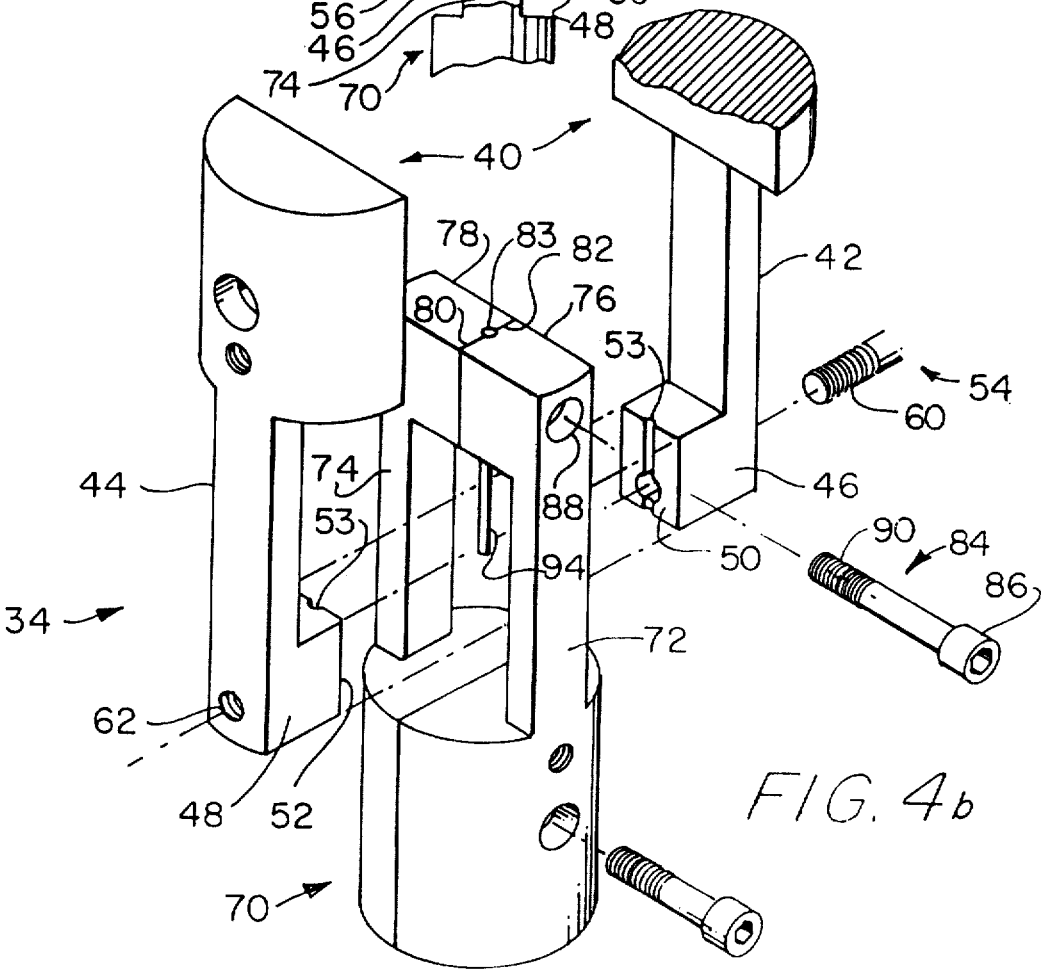
FIG. 4b

IMBALANCE DETERMINING APPARATUS AND METHOD

Matter enclosed in heavy brackets [ ] appears in the original patent but forms no part of this reissue specification; matter printed in italics indicates the additions made by reissue.

The present invention relates to apparatus and method for determining the amount and location of imbalance in an article which is to be balanced about an axis, and particularly to a precision apparatus and method for statically determining the amount and location of imbalance in such an article.

Machines which determine the amount and location of imbalance in parts which are to be balanced about preselected axes by suspending such parts from their axes and allowing the parts to tilt in response to the imbalance are commonly referred to as static balancing machines. Typically such machines measure and interpret the amount of tilt to obtain an indication of the amount and location of imbalance. Static balancing machines are generally accepted as being reliable, simple to operate, and accurate. However, static balancing machines suffer certain shortcomings. For example, most static balancing machines include fixtures, such as spindles or chucks, upon which parts to be processed are positioned. When a part is suspended from its axis upon a static balancing machine and the machine spindle which supports the part begins to tilt, the mass of the tilting spindle of the machine itself enters into any determination of the amount and location of imbalance in the part.

According to the invention, an apparatus for determining imbalance in an article which is to be balanced about an axis includes a base and means for receiving and positioning the article. The article receiving means is supported upon the base for substantially free tilting movement generally about a point on a vertical axis defined by the base. The article receiving means may include a spindle, chuck or other locating apparatus so that the axes of articles placed thereon will coincide with a predetermined location on the article receiving means. The apparatus includes means for sensing the orientation of the article receiving means and means for applying a force at at least one selected location to the article receiving means to orient it at a substantially neutral position. The axis may be an axis of rotation or some other axis of symmetry of the article.

The terms "neutral position", "neutral orientation" and the like as used herein shall mean a balanced or rest position or orientation. Typically, when the disclosed system is in such position or orientation, the article receiving means will be positioned so that an article being checked for balance will assume a generally horizontal orientation.

In an embodiment of the present invention, the means for sensing the orientation of the article receiving means comprises at least first and second proximity indicator means positioned approximately 90° about the article axis. The proximity indicator means monitor distances related to the distance between the article receiving means and the base. Each proximity indicator means produces a usable output related to the distance it detects.

The means for applying the force desirably comprises first and second force coils positioned substantially 90° apart about the axis of the article and responsive to signals related to the proximity indicator means outputs to bring the article receiving means into a neutral position. The forces exerted by the first and second coils can be resolved to a single force at a single location about the axis. This force represents the amount of imbalance.

In an embodiment of the invention, the means for indicating the amount and location of imbalance comprises a visual display panel coupled to the proximity indicator means. The proximity indicator means outputs are coupled to the panel to produce a visual display of the location and amount of the applied force necessary to bring the article receiving means to the neutral position. A workman can use this displayed information to correct the imbalance existing in the article.

Further, according to the present invention, a method is presented for determining the amount and location of imbalance in an article which is to be balanced about an axis. The method comprises the steps of placing the article on an article receiving means with the axis in a predetermined orientation with respect to the article receiving means, applying a force to the article receiving means to bring it into a neutral orientation and determining the amount and position of the force applied.

In one embodiment of the method, at least first and second proximity indicator means measure the spacing between a surface of the article receiving means and a surface of a base upon which it is substantially freely movably supported. Desirably, the proximity indicator means comprises four proximity transducers positioned at 90° intervals about the axis to measure the spacing. The proxmity transducers produce outputs representative of the spacing. The step of applying the force at a predetermined location to the article receiving means desirably is performed by a pair of force coils positioned 90° apart about the article axis between the article receiving means and the base. The force coils are responsive to signals related to the proximity transducer outputs to equalize those outputs, thereby bringing the article receiving means, and the article thereon, into a neutral orientation.

In the illustrated embodiment, the article receiving means comprises a table and a locating fixture, i.e., a spindle and chuck. The proximity indicator means outputs are in analog form, i.e., each of four proximity transducers produces an output related by a predetermined known function to the table-base spacing which it monitors. These analog outputs are processed to generate first and second force coil input signals which are provided to the first and second force coils, respectively. These signals cause the force coils to bring the table-article system to neutral orientation. The proximity transducer output signals are also processed and converted to digital information by an analog-to-digital converter ultimately to provide a visual indication of the amount and location of imbalance in the table-article system.

In an illustrative embodiment, the means for processing the digital outputs of the analog-to-digital converter comprises a digital computer. The means for producing the first and second force coil input signals comprises electronic circuitry.

Generally, static balancing machines measure forces generated along two perpendicular axis, generally referred to as X- and Y- axes or 0° and 90° axes, respectively. Such forces are generated by imbalance existing in the system comprising the article to be balanced and the apparatus, usually a table, including a locating chuck and/or spindle, upon which the article is positioned. The forces arising due to the imbalance along these two perpendicular axes are resolved to a single force at a single location about the axis of the article. This force and location are interpreted by a workman or by automatic machinery either to add or remove material at the location of imbalance. Material is added or removed as necessary to correct the amount of imbalance.

The term "amount and location of imbalance" as used hereinafter refers to an amount of material, usually expressed as either a mass or a weight of material, which can be added to an article at a particular location about an axis of the article to balance it about that axis. It is to be understood, however, that the instant invention is equally useful in situations in which material is to be removed from an article to correct imbalance.

The invention may best be understood by referring to the following description and accompanying drawings which illustrate the invention.

In the drawings:

FIG. 2 is a side elevational view of a portion of that apparatus;

FIG. 3 is a top plan view of the apparatus of FIG. 2;

Figure 1:
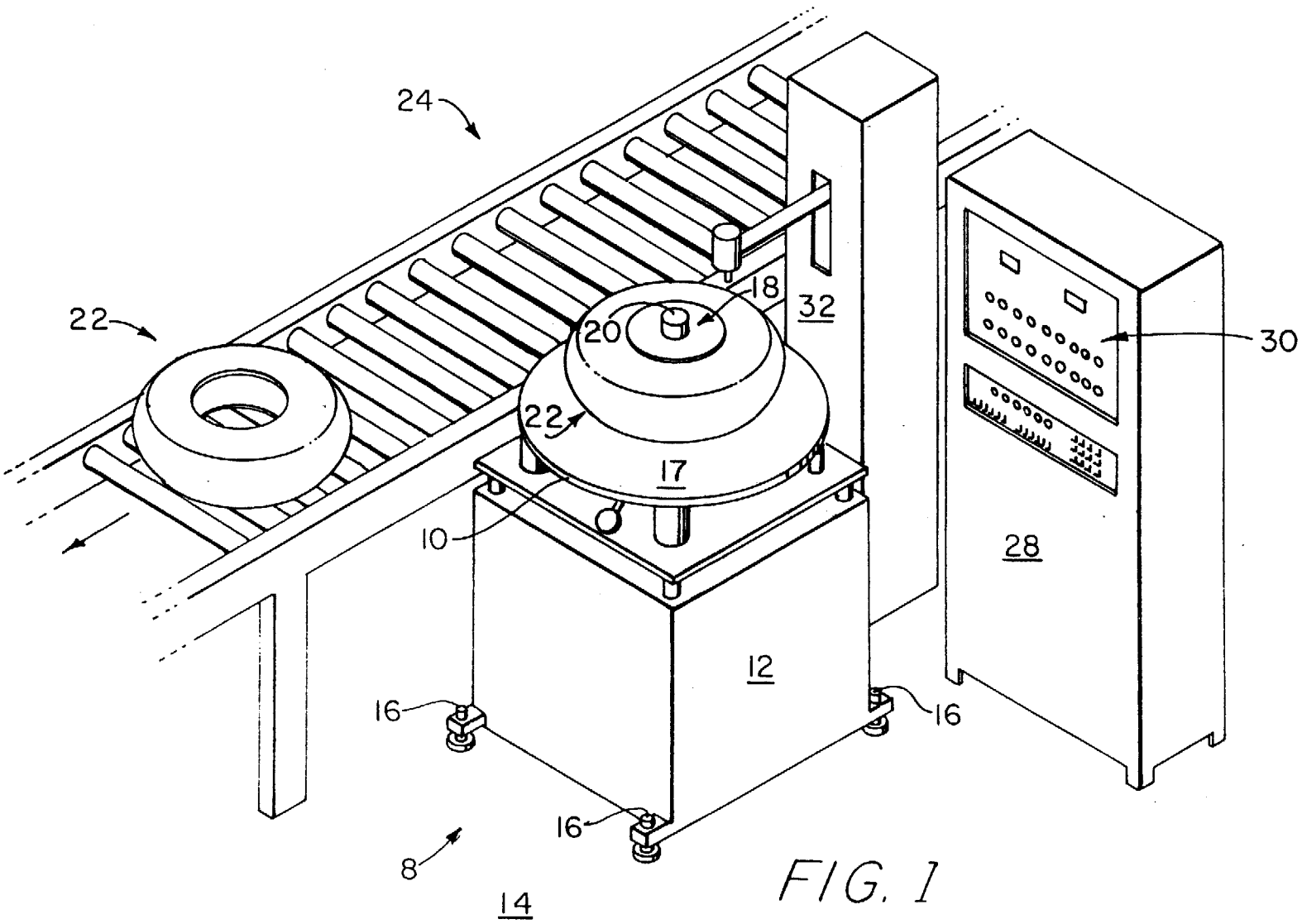
FIG. 1 is a perspective view of an apparatus constructed in accordance with the present invention.
Figure 4C:
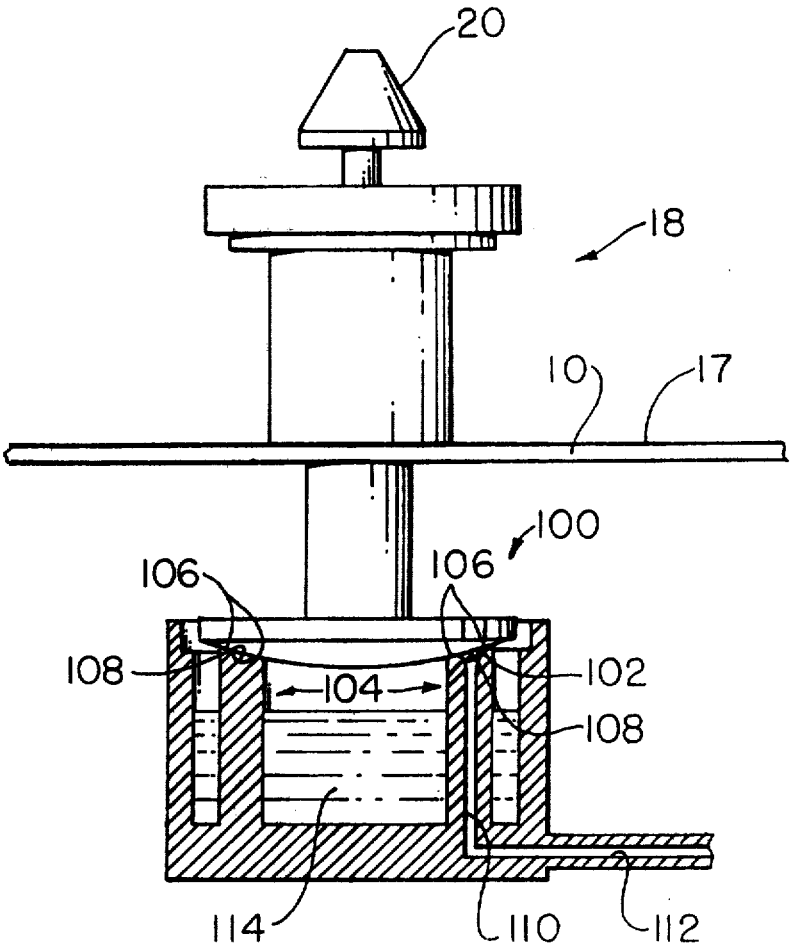
Figure 5:
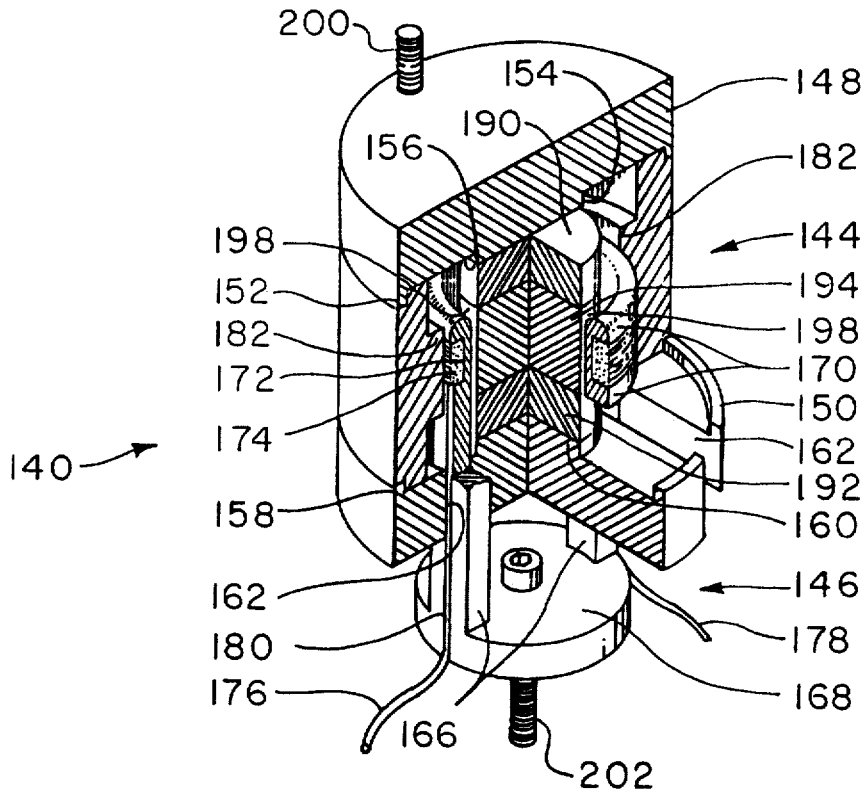
Figure 6A:
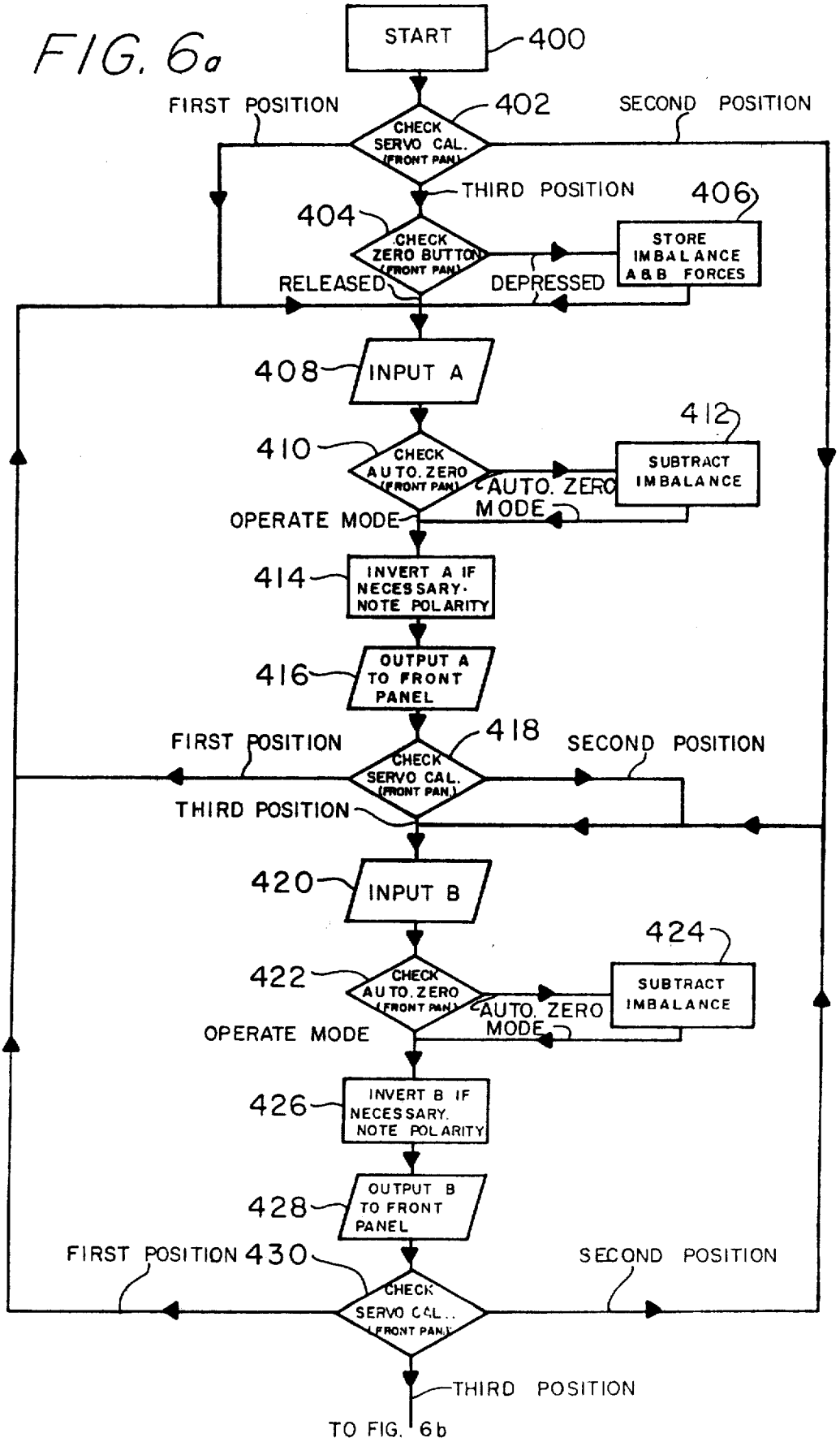
Figure 6B:
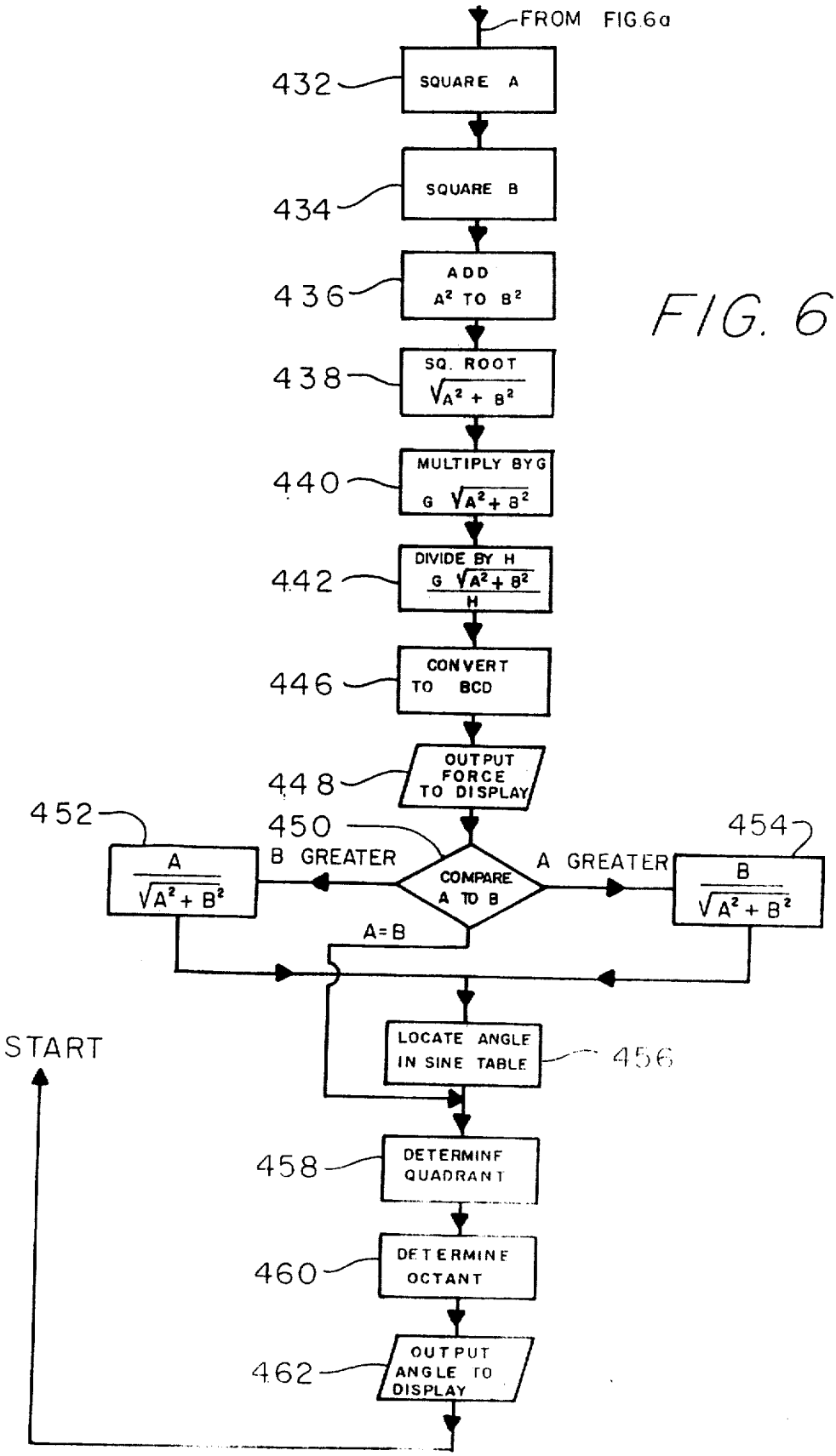
Figure 7:
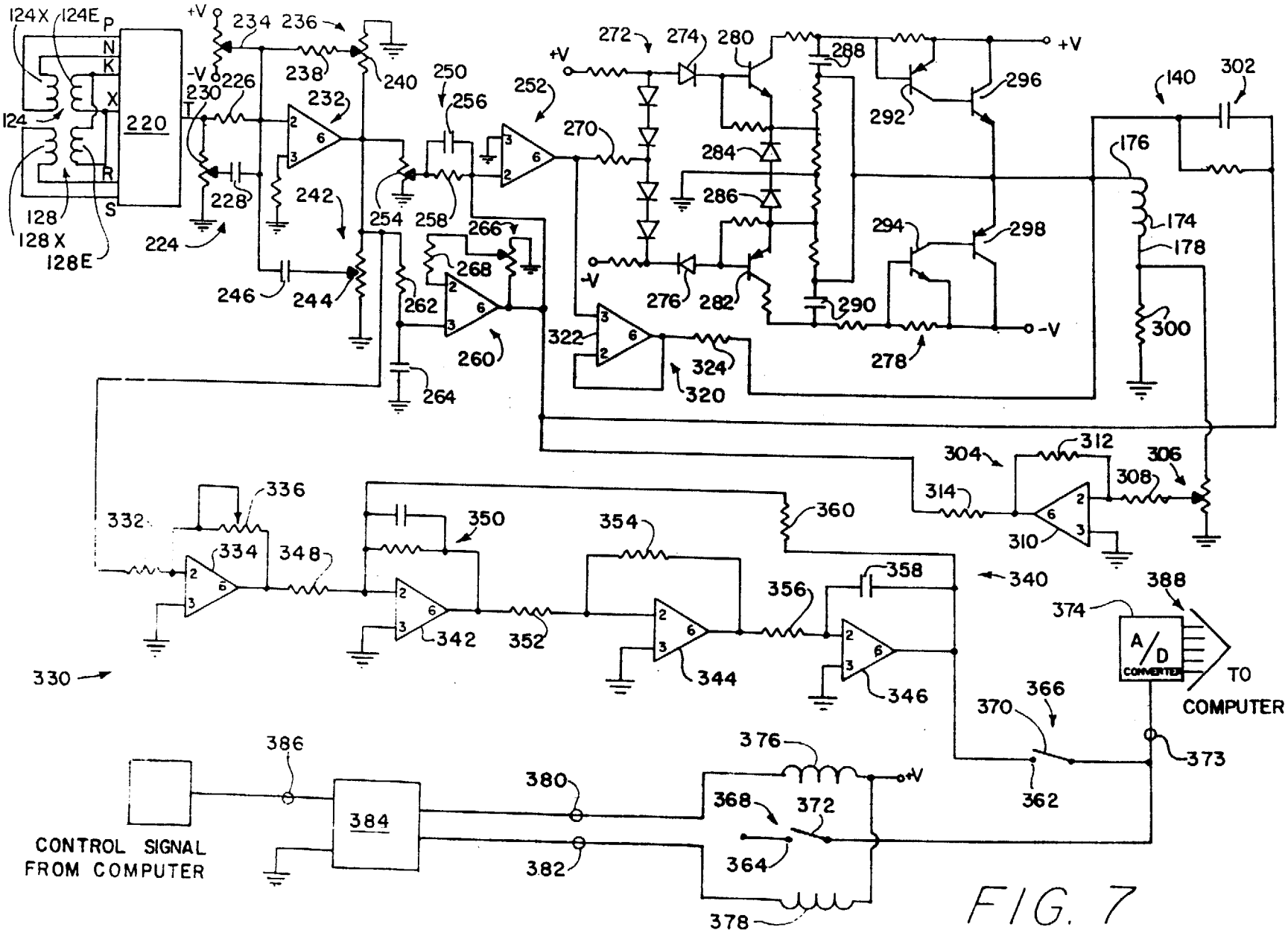

FIGS. 4a–b are partial sectional vertical elevational and fragmentary perspective views, respectively, of an alternative detail of a portion of the apparatus of FIGS. 2–3;

FIG. 4c is a partial sectional vertical elevational view of an alternative detail of a portion of the apparatus of FIGS. 2–3;

FIG. 5 is a sectional perspective view of a detail of the apparatus of FIGS. 1–3;

FIGS. 6a–b are flow diagrams illustrating various steps in the processing of outputs from the apparatus of the figures to produce signals for use by that apparatus; and FIG. 7 is a partly block and partly schematic circuit diagram of a part of the apparatus of FIG. 1 useful for performing certain of the process steps listed in FIG. 6.

FIG. 1 illustrates a station 8 at which is determined the amount and location of imbalance of a part to be balanced about an axis. The station includes a table 10 movably mounted upon a base 12. The illustrated table 10 is freely pivotally mounted upon base 12 by a conventional pivot mechanism. Table 10 is generally flat and circular so that its center of mass lies as close as possible to its geometric center. Two types of pivots will be discussed hereinafter in connection with FIGS. 4a–c. The base 12 rests upon a floor 14 on four corner leveling legs 16 which are adjustable so that the top surface 17 of table 10 is perpendicular to the direction of gravitational attraction at the center of the table.

The center of table 10 is equipped with an orienting spindle 18 and chuck 20 for positioning and holding an article to be balanced. In the illustrated embodiment, the articles to be balanced are wheel-and-tire assemblies 22 which are to be balanced about their axes of rotation. Assemblies 22 are conveyed along a conveyor 24 to station 8 where they are loaded onto table 10, one at a time. The amount and location of imbalance in each assembly 22 is determined by the apparatus at station 8, and each assembly 22 is marked with some indication of its amount and location of imbalance, either manually or automatically. Assemblies 22 are then unloaded from table 10 and proceed along conveyor 24 away from station 8 to a balance correcting station (not shown). The axis of rotation of assemblies 22 coincide with the axis 26 of spindle 18 and chuck 20 (see FIGS. 2–3).

Station 8 includes a data processor or digital computer 28 which is coupled to apparatus on table 10 and processes information received regarding the amount and location of imbalance in each assembly 22 processed thereby. Desirably, computer 28 includes a visual display panel 30 upon which is displayed information regarding the amount and location of imbalance in each assembly 22 processed. Typically, the signals which drive the various display elements on panel 30 also control any automatic marking apparatus 32 which is used to mark, e.g., the location of imbalance on the processed assemblies 22. Other signals generated by the computer 28 can be used to control any automatic equipment (not shown) for correcting imbalance in the processed assemblies 22, e.g., adding or subtracting weight at the location of imbalance.

Referring now to FIGS. 2–3, table 10 and base 12 are illustrated in greater detail. Table 10 is supported from base 12 upon a pivot mechanism 34 which allows the table to move freely with respect to the base. The pivot mechanism may be of any suitable type. Two typical pivotal mechanisms 34 are illustrated in FIGS. 4a–c. The mechanism 34 of FIGS. 4a–b is typically referred to as a wire pivot. This pivot consists of an upper carrier 40 which is attached to the underside of table 10 and which has two downwardly extending fingers 42, 44. At the ends of fingers 42, 44 are blocks 46, 48, respectively. Blocks 46, 48 have adjacent surfaces, respectively, provided with registering gooves 53. Surfaces 50, 52 can be drawn together by tightening an adjusting cap screw 54, the head 56 of which engages a shoulder 58 in block 46, and the threads 60 of which engage threads 62 in block 48.

A lower carrier 70 includes upwardly projecting fingers 72, 74 at the ends of which are formed blocks 76, 78, respectively. Blocks 76, 78 include adjacent surfaces 80, 82 defining registering grooves 83. Surfaces 80, 82 can be drawn together by an adjustment screw 84, the head 86 of which engages a shoulder 88 in block 76, and the threads 90 of which engage threads 92 in block 78. A wire 94 is captured between surfaces 50, 52 in grooves 53 at its lower end and between surfaces 80, 82 in grooves 83 at its upper end. Wire 94 is resilient to present minimum resistance to movement of table 10 with respect to base 12. Wire 94 must be capable of supporting the weight of table 10 and the assemblies 22 which are placed thereon.

A second pivot mechanism, illustrated in FIG. 4c is referred to as a spherical hydraulic pivot. This pivot comprises an upper member 100 having a downwardly and outwardly facing male spherical surface 102 and a lower member 104 having an upwardly and inwardly facing female spherical surface 106. Surfaces 102, 106 have equal radii of curvature. A groove 108 extends about surfaces 106 to provide a channel through which a hydraulic fluid is pumped. Fluid is introduced into groove 108 through bore 110 which extends into and vertically upwardly through lower member 104 from a hydraulic fitting 112. A reservoir 114 is formed by lower member 104. Reservoir 114 collects hydraulic fluid which is pumped from groove 108 under pressure by a pump (not shown) through hydraulic fitting 112 and bore 110. The hydraulic fluid flows between surfaces 102, 106, allowing upper member 100 to move freely with respect to lower member 104.

Returning to FIGS. 2-3, table 10 includes a downwardly facing surface 120. Base 12 includes upwardly facing surface 122. Four proximity indicators 124, 126, 128, 130 are mounted on surface 122 at 90° intervals about the axis 26. Indicators 124–130 in the illustrated embodiment are of a type generally referred to as proximity transducers. These transducers are series 050PT proximity transducers manufactured by Schaevitz Engineering, Pennsauken, New Jersey. Such devices have a substantially linear voltage output for distances of from 0 to 0.05 inch between the transducer and a proximate ferromagnetic object. A cylindrical column 132 of a ferromagnetic material is attached to surface 120 of table 10 in axial alignment with each of transducers 124–130. Each column 132 projects into close proximity with one of transducers 124–130. The output signals of the various transducers 124–130 are representative of the distance between the downwardly facing surfaces of columns 132 and the active faces of respective transducers 124–130.

The imbalance determining system also includes first and second force coils 140, 142, respectively. Force coil 140 is located adjacent proximity transducer 124. Force coil 142 is located adjacent proximity transducer 126. A line extending through axis 26 and the centers of transducer 124 and force coil 140 will hereinafter be referred to as the 0° axis. A line extending through axis 26 and the centers of transducers 126 and force coil 142 will hereinafter be referred to as the 90° axis. A line extending through axis 26 and the center of proximity transducer 128 will hereinafter be referred to as the 180° axis. A line extending through axis 26 and the center of proximity transducer 130 will hereinafter be referred to as the 270° axis.

Force coils 140, 142 are energized in a manner to be explained subsequently to produce either attractive or repulsive forces between surfaces 120, 122 of the table 10 and base 12, respectively. The forces produced are independent of one another and can be resolved into a single force at a selected position about axis 26 of table 10. Force coils 140, 142 are substantially identical. FIG. 5 is a detailed drawing of an illustrative construction of force coil 140.

Referring to FIG. 5, force coil 140 includes a generally cylindrical housing 144 and an open bobbin frame 146 sized to be loosely received in housing 144. Housing 144 is closed at its upper end by an upper closure cap 148 and at its lower end by a lower closure cap 150. Upper cap 148 includes two downwardly projecting bosses 152, 154. Boss 152 forms a downwardly extending positioning ridge about the periphery of upper cap 148. Boss 154 forms a pedestal which is coaxial with upper cap 148 and extends downwardly from the bottom surface 156 thereof. Lower cap 150 includes two upwardly projecting bosses 158, 160. Boss 158 forms a positioning ridge about the periphery of cap 150. Boss 160 forms a pedestal which is coaxial with cap 150. Cap 150 also includes a pair of chordally extending slots 162. Slots 162 loosely receive a pair of legs 166 of bobbin frame 146. Legs 166 protect upwardly from an attachment plate 168 at the bottom of bobbin frame 146. A bobbin 170 is supported from the tops of legs 166. Bobbin 170 includes a peripherally extending outwardly opening groove 172 into which are wound several turns 174 of conducting wire. In the illustrated embodiment, there are 100 turns of No. 31 copper wire. The leads 176, 178 of turns 174 are secured in grooves 180 on the external surfaces of legs 166, e.g., by gluing. A peripherally and radially inwardly extending ring 182 is formed about the interior side wall of housing 144. Ring 182 insures that the magnetic field will be uniform and strong vertically above and below turns 174 for a substantial distance. Thus, when the housing 144 moves relative to the bobbin frame 146, the strength of the field within which turns 174 are immersed remains substantially constant.

A pair of solid cylindrical magnets 190, 192 are situated on bosses 154, 160, respectively, of the upper and lower caps 148, 150. Magnets 190, 192 are positioned so that their north poles face one another. A spacer 194 is placed between the facing north poles of magnets 190, 192 during assembly of the force coil. Spacer 194 is made of a ferromagnetic material. Magnets 190, 192 and spacer 194 thus establish a quite strong radially outwardly directed magnetic field throughout the cylindrical space 196 between the sidewall 198 of spacer 194 and the cylindrical wall of ring 182. Turns 174 are immersed in this field. Thus, current flow through turns 174 causes a force between turns 174 (and bobbin frame 146 upon which they are wound) and housing 144. It will be appreciated that when housing 144 is attached to surface 120 by one or more attachment screws 200, and attachment plate 168 is attached to surface 122 by one or more screws 202, forces of attraction and repulsion can be generated between table 10 and base 12 by energizing the turns of force coils 140, 142.

In the illustrated embodiment, bobbin frame 146 is constructed from aluminum. Housing 144 and caps 148, 150 are made of a ferromagnetic material to provide flux return paths for magnets 190, 192. Magnets 190, 192 are produced from a proprietary cobalt-samarium alloy with the trade name HICOREX, available from Hitachi Magnetics Corp., Edmore, Michigan.

Referring now to FIG. 7, an electronic circuit for use with the apparatus of FIGS. 1-3 will be explained. It is to be understood that the circuit of FIG. 7 is intended for use with one pair of diametrically opposed proximity transducers, e.g., the pair 124, 128 or the pair 126, 130, and one of the force coils, e.g., 140 or 142, respectively. However, identical circuitry can be used to drive the remaining force coil in response to signals generated by the remaining pair of proximity transducers.

In the illustrated embodiment, proximity transducers 124, 128 are coupled to a signal processing circuit 220 illustrated in block form. Circuit 220 in the illustrated embodiment is a SMS/GPM/LVDT signal conditioning module manufactured by Schaevitz Engineering.

Each of proximity transducers 124, 128 includes an exciting coil 124e, 128e, respectively. Coils 124e, 128e are coupled in parallel between terminals K, X of module 220 and are excited by module 220. Each of transducers 124, 128 also includes an output coil 124x, 128x, respectively. Coil 124x is coupled across terminals P and N of module 220. Coil 128x is coupled across terminals R and S of module 220. Coils 124x and 128x produce voltages across terminals PN and RS, respectively, which are representative of the proximity of transducers 124, 128 to their respective columns 132 (see FIGS. 2-3).

Module 220 operates in the following manner: If the potential across terminals PN exceeds that across terminals RS, the potential on the output terminal, T, is negative. If the potential across terminals RS exceeds the potential across terminals PN, the potential on terminal T is positive. If the potentials across terminals PN and RS are equal, the potential on terminal T is zero.

Terminal T of module 220 is coupled to a rate feedback network 224 comprising a resistor 226, a capacitor 228 and a potentiometer 230. This circuit is coupled to an input terminal, pin 2, and the output terminal, pin 6, of an operational amplifier 232. The feedback network 224 varies the amount of feedback at pin 2 according to the rate of change in the potential at terminal T. If the potential at terminal T is unchanging, or the rate of change in that potential is very small, little or no feedback appears at pin 2 of amplifier 232. As the rate of change of potential on terminal T increases, the amount of feedback due to network 224 increases. This prevents excessively high rates of change in the current through the turns 174 of force coil 140. Limiting of the rate of change of current through turns 174 reduces the possibility of large excursion, high-speed movement by table 10. Such movement is to be avoided to prevent undesirable oscillation by the table as it seeks to bring a particular assembly 22 to a neutral orientation.

Operational amplifier 232 in the illustrated embodiment is an LM 301 operational amplifier. In the description of FIG. 7, unless otherwise specified, all operational amplifiers are of this type.

A zero control potentiometer 234 is also coupled to pin 2 of amplifier 232. Potentiometer 234 is coupled between +V and −V voltage supplies to supply a selected offset potential to pin 2. Potentiometer 234 can be used to bring table 10 to a neutral orientation before any assemblies 22 to be balanced are placed thereon.

A gain control circuit 236 comprising a resistor 238 and a potentiometer 240 is coupled between the output terminal, pin 6, of amplifier 232 and pin 2 thereof. Circuit 236 provides for adjustment of the gain of amplifier 232. Desirably, this gain will be adjusted as high as possible, but low enough to prevent undesirable oscillation of table 10.

A rate control circuit 242 is coupled between pins 2 and 6 of amplifier 232. Rate control circuit 242 comprises a potentiometer 244 and a capacitor 246. Circuit 242 provides for adjustment of the upper corner frequency of amplifier 232. Such upper corner frequency can be adjusted to prevent high frequency oscillation of table 10.

A gain control circuit 250 is coupled between pin 6 of amplifier 232 and the input terminal, pin 2, of an operational amplifier 252. Circuit 250 includes a potentiometer 254, a capacitor 256, and a resistor 258.

A "slow zeroing" operational amplifier 260 is also coupled between the output terminal of amplifier 232 and the input terminal of amplifier 252. Signals are supplied to input pin 3 of amplifier 260 through an RC network including a resistor 262 and a capacitor 264. Feedback is provided for amplifier 260 by a potentiometer 266 and a resistor 268 which are coupled between the output terminal, pin 6, and an input terminal, pin 2, of amplifier 260. Amplifier 260 helps to prevent excessively rapid oscillation of table 10 by generating at pin 2 of amplifier 252 a very slowly changing correcting signal for large-magnitude deviations of the orientation of table 10 from its neutral orientation.

Pin 6 of amplifier 252 is coupled through a resistor 270 to a biasing network 272. Network 272 includes two oppositely poled diodes 274, 276, which couple network 272 to a driver circuit 278 for turns 174 of force coil 140. Circuit 278 includes complementary symmetry predriver transistors 280, 282. The circuits of transistors 280, 282 include clamping diodes 284, 286, respectively, coupled between the emitters of transistors 280, 282 and ground. The output circuit of transistors 280 includes a frequency limiting capacitor 288. The output circuit of transistor 282 includes a frequency limiting capacitor 290.

Drive circuit 278 further includes complementary symmetry driver transistors 292, 294. The base of transistor 292 is coupled to the collector of transistor 280. The base of transistor 294 is coupled to the collector of transistor 282. The emitter of transistors 292, 294 are coupled to the +V and −V voltage supplies, respectively. The collectors of transistors 292, 294 are coupled to the bases of two complementary symmetry output transistors 296, 298, respectively. The emitters of transistors 296, 298 are direct coupled to lead 176 of force coil 140. Transistor 296 thus provides current flow in a first direction through turns 174, while transistor 298 provides current flow in the opposite direction therethrough. Lead 178 is coupled through a feedback resistor 300 to ground.

Voltage feedback from force coil 140 is provided by a parallel RC circuit 302 coupled between lead 176 and input pin 2 of amplifier 252. Current flowing through turns 174 is directly related to the force exerted by force coil 140. Substantially all of this current also flows through resistor 300. A voltage signal directly related to force exerted by coil 140 is thereby produced. To process this signal, a current feedback circuit 304 is coupled between lead 178 and pin 2 of amplifier 252.

Current feedback circuit 304 includes a potentiometer 306 and an input resistor 308 coupled between lead 178 and an input terminal 2 of an amplifier 310. A feedback resistor 312 is coupled between the output terminal, pin 6, of amplifier 310 and input pin 2 thereof. A resistor 314 is coupled between pin 6 of amplifier 310 and pin 2 of amplifier 252. Circuit 304 provides at pin 2 of amplifier 252 a voltage signal which is proportional to the force exerted by force coil 140 between table 10 and base 12.

An additional force coil driving circuit 320 is provided in parallel with biasing network 272 and driving circuit 278. Circuit 320 includes an operational amplifier 322 and a series resistor 324. Amplifier 322 is connected in noninverting configuration, with an input terminal, pin 2, and output terminal, pin 6, thereof connected together. The noninverting input terminal, pin 3, of amplifier 322 is coupled to pin 6 of amplifier 252. Pin 6 of amplifier 322 is coupled through resistor 324 to lead 176. Driving circuit 320 is provided to prevent the "backlash" or dead space which is frequently encountered in systems such as the instant one. Such backlash results when an error voltage, such as the voltage at pin 6 of amplifier 252, is too small to produce an error-correcting current flow in turns 174. In the particular system illustrated in FIG. 7, error voltages at pin 6 of amplifier 252 which are not in excess of the bias offset voltages produced by biasing network 272 and driving circuit 278 will result in no output current flow from one of transistors 296, 298. In the absence of driving circuit 320, no current would flow in turns 174. Thus, such small error voltages at pin 6 of amplifier 252 would mean that no force would be generated by coil 140 between table 10 and base 12. It would be virtually impossible for table 10 to be driven to its neutral orientation with no current flow through force coil 140. Circuit 320 alleviates this problem, amplifying the very small error voltages at pin 6 of amplifier 252 to provide a small correcting current flow through resistor 324 and turns 174, allowing force coil 140 to drive table 10 to its neutral orientation from small error orientations.

In order to produce signals related to the amount of force exerted by force coils 140, 142 between table 10 and the base 12 and to use these force-related signals to calculate a single balance-correcting force at a single location about each article 22 to be processed, interface circuit 330 of FIG. 7 is provided. The orientation error correcting voltage signal at pin 6 of amplifier 232 is coupled through an input resistor 332 to a gain adjust operational amplifier 334. A gain adjust potentiometer 336 is coupled between pin 2 of amplifier 334 and the output terminal, pin 6, thereof. Interface circuit 330 also includes a two-pole filter circuit 340 for removing from the error correcting signal appearing at pin 6 of amplifier 232 all variations having frequencies above a predetermined cutoff. In the illustrated embodiment, the cutoff frequency is 1 Hertz (Hz).

Circuit 340 includes three serially coupled operational amplifiers 342, 344, 346. Pin 6 of amplifier 334 is coupled to the input terminal, pin 2, of amplifier 342 through a resistor 348. Feedback is provided from the output terminal, pin 6, of amplifier 342 through a parallel RC circuit 350 to pin 2 thereof. Pin 6 of amplifier 342 is coupled through a series resistor 352 to the input terminal, pin 2, of amplifier 344. Feedback is provided between the output terminal, pin 6, of amplifier 344 and pin 2 thereof through a resistor 354. Pin 6 of amplifier 344 is coupled to an input terminal, pin 2, of amplifier 346 through a resistor 356. A feedback capacitor 358 is coupled to the output terminal, pin 6, of amplifier 346 and pin 2 thereof. A feedback resistor 360 is coupled between pin 6 of amplifier 346 and pin 2 of amplifier 342. Very low frequency (1 Hz maximum) signals related to the force generated by force coil 140 thus appear at a terminal 362 which is coupled to pin 6 of amplifier 346.

Circuitry identical to that hereinbefore described is coupled between proximity indicators 126, 130 and force coil 142. Such circuitry (not shown) produces on a terminal 364 very low frequency signals related to the force exerted by force coil 142.

Terminals 362, 364 are terminals of two high speed read relays 366, 368, respectively. Terminal 362 is one terminal of a switch 370 of relay 366. Terminal 364 is one terminal of a switch 372 of relay 368. The remaining terminals of switches 370, 372 are coupled together and to an input line 373 of an analog-to-digital (A/D) converter 374. The actuating coils 376, 378 of relays 366, 368, respectively, are coupled between +V voltage supply and two input lines 380, 382, respectively, of a flip-flop 384. A flip-flop control signal is coupled to an input line 386 of flip-flop 384 from a clock circuit in the digital computer 28 of FIG. 1. The clock circuit generates on line 386 a signal which causes current to flow alternately in coils 376, 378. Such current closes switches 370, 372 alternately, effecting time-division multiplexing of A/D converter 374. The output lines 388 of A/D converter 374 alternately carry digital signals representing the forces generated in force coils 140 and 142. The computer, being the source of the multiplexing control signals on line 386, determines whether the signals it is receiving from A/D output lines 388 are representative of the force generated by coil 140 or, alternatively, the force generated by coil 142.

Turning now to FIG. 6, the manner in which the computer utilizes the digital signals present on lines 388 to calculate the amount of location of imbalance will be explained.

In the computer program illustrated in flow chart form in FIG. 6, the force generated by force coil 140 is referred to as a "A" force and the force generated by force coil 142 as the "B" force. The computer program starts at block 400 of FIG. 6. The program proceeds to block 402 to cause the computer 28 of FIG. 1 to check the position of a "servo calibrate" switch on the computer 28 front panel. This switch is a multi-position switch. In a first position, this switch disables flip-flop 384 of FIG. 7 to cause digital signals representative of the force generated by coil 140 only to appear on output line 388 of A/D converter 374. In a second position, this switch causes the output lines 388 of A/D converter 374 to carry digital signals representative of the force generated by coil 142 only. In a third position, this switch places the system in its normal operating mode in which the analog signals representative of the forces generated by coils 140, 142 are multiplexed onto the input line 373 of A/D converter 374.

When the "servo calibrate" switch is in its third position, the program next proceeds to block 404, causing the computer to check the position of a press-to-actuate "check zero" button. If the "check zero" button is depressed, the program causes the multiplexed forces generated by coils 140, 142 to be stored in the computer. See block 406. The "check zero" button will not be actuated by an operator unless the table 10 (FIGS. 1-3) is empty. The purpose of this portion of the program is to store any inherent imbalance existing in table 10 and its associated components prior to processing of articles 22. Typically, the "check zero" button will be depressed infrequently, e.g., after every tenth assembly 22 is processed. For the several assemblies which are processed between operations of the "check zero" button, the error in the balance table of table 10 which will be used by the computer program for further calculations will be the last error stored in the operations indicated in blocks 404, 406.

When the "servo calibrate" switch (block 402) is in either the first or third position, the digital signal representative of the force being generated by force coil 140 is input for further use by the computer as indicated by block 408. The computer program is controlled as indicated in blocks 410, 412 by an operator-controlled "auto zero" switch which allows the operator automatically to zero (bring to neutral orientation) table 10. With this switch in the "auto zero" mode, the computer utilizes the error stored by the operation discussed in connection with blocks 404, 406. This error is subtracted from the input from force coil 140 after an article 22 has been placed on table 10 for processing. The computer produces a signal for display related to the force necessary to correct the article 22 imbalance only. With the "auto zero" switch in a normal operating position, the "raw" digital related to the force coil 140 force is processed by the computer without adjustment for any pre-existing imbalance in table 10. Thus, a digital output display provided by the computer shows imbalancing existing in table 10, if any, plus any imbalance existing in an article 22 which is being processed.

Next, in block 414, the computer considers the sign of the digital signal representing the force being exerted between table 10 and base 12 by force coil 140. Such force can be either positive (tending to pull table 10 and base 12 toward one another) or negative (tending to push table 10 and base 12 away from one another). The computer stores the sign of this force and uses the magnitude, $|A|$, of this force for further processing. The magnitude and the sign of such force are then displayed on the display panel 30 (FIG. 1), as indicated by block 416.

If the "servo calibrate" switch (block 402) is in the second position, the program causes the computer to accept for further calculation digital input information representative of the force being exerted by coil 142. The steps of this process will be explained hereinafter.

The computer next checks the position of the "servo calibrate" switch again. Block 418 illustrates this step. If the switch is in the first position, the program returns to the step illustrated in block 408. If the "servo calibrate" switch is in either the second or third position, the computer accepts from A/D converter 374 (FIG. 7) digital information representing the force being exerted by coil 142. This step is illustrated by block 420.

The program next causes the computer to check the position of the "auto zero" switch. See block 422. The computer checks this switch position to determine whether the operator wants the computer automatically to zero the digital information representative of the coil 142 force to null any force component attributable to imbalance in table 10, or to present the "raw" digital data representative of the coil 142 force. Again, the "auto zero" mode will cause the program to go to block 424 and subtract from the raw imbalance data received from force coil 142 any information stored as a result of the operations illustrated in blocks 404, 406.

The computer next checks the polarity of the digital signal representative of the coil 142 force. See block 426. As with coil 140, the force exerted by coil 142 can either be positive or negative. If the sign of the force is negative, this sign information is stored in the computer and the force is inverted to obtain its magnitude, $|B|$. The magnitude and sign of the digital signal representative of force generated by coil 142 are then supplied to the display panel 30 (FIG. 1) of the computer, as indicated in block 428.

The computer next checks the position of the "servo calibrate" switch again. As block 430 illustrates, if the switch is in the first position, the computer returns to block 408 to accept digital signals reltated to the force exerted by coil 140. If the switch is in the second position, the computer continues to accept digital information representative of the force exerted by coil 142 beginning at block 420. If the "servo calibrate" switch is in the third, or normal operating position, the computer proceeds to the next step illustrated in block 432 of the flow chart.

Now the computer begins the computations necessary to combine the two forces applied to the table along the 0° and 90° axes by coils 140, 142, respectively, into a single force at a single location about the axis 26 of table 10. The computer squares the digital signal representing the force being exerted by coil 140. See block 432. The computer squares the digital signal representing the force being exerted by coil 142. See block 434. The computer then adds these squares together, block 436, and obtains the square root of the sum, block 438. Next the computer multiplies the square root by a scaling factor G. See block 440. Since computer 28 (FIG. 1) in the illustrative embodiment does not have floatng point capability, scaling factor G causes the computer to adjust the range of the square root calculated in block 440 to provide maximum significance to the digits of the square root for subsequent computation. The computer next divides the $G\sqrt{A^2+B^2}$ product by a scaling factor H, as illustrated in block 442. In the illustrated embodiment, H equals 32 since the amount of imbalance of any article 22 to be processed is to be resolved to 1/32 ounce increments.

In blocks 444, 446, the computer converts the square root, adjusted by the factors G and H, to binary coded decimal (BCD) information and displays this force on display panel 30. It must be understood that this displayed force is representative of the amount of imbalance existing in the article 22 being processed.

In block 450, the computer compares the magnitudes of the forces generated by coils 140 and 142. If the magnitude of the force generated by force coil 142 is greater, the computer divides the square root of the sum of the squares of the forces generated by both coils into the force generated by coil 140, as indicated in block 452. If the force generated by coil 140 is greater, the computer divides the square root of the sum of the squares into the force generated by coil 142, as indicated by block 454. If the magnitudes of the forces generated by coils 140, 142 are equal, the computer recognizes that the imbalance in the assembly 22 being processed lies at one of the following locations with respect to the zero axis; 45°; 135°; 225°; or, 315°.

If either of the forces is greater than the other, the computer proceeds to the step illustrated in block 456. Stored in the computer memory are sines of all angles between 0° and 45° in 1° increments, and the angles corresponding to these sines. The computer locates the angle corresponding to the sine calculated in either block 452 or block 454.

Regardless of the outcome of the decision indicated in block 450, the program causes the computer to consider the signs of both forces. The signs are determined from the information stored in the computer as described in connection with blocks 414, 426. Assuming that negative forces exerted by coils 140, 142 are forces tending to urge the bobbins 146 and housings 144 of the coils (see FIG. 5) in opposite directions, and positive forces generated by coils 140, 142 are those tending to draw their respective bobbins 146 and housings 144 toward one another, the signs of the generated forces can be compared to determine in what quadrant of the circle whose center lies on axis 26 the imbalance exists. This step is performed as indicated in block 458.

Next, in block 460, the information relating to which of the forces is greater is again considered. This consideration allows the computer to determine which half of the quadrant determined in block 458 contains the location of imbalance. Once this octant has been determined, the angle determined in block 456 is used by the computer to calculate the location of imbalance to within approximately ½°. As indicated in block 462, this location of imbalance, in angular form, is displayed on display panel 30 of computer 28 (see FIG. 1). The apparatus of FIG. 1 is then ready to begin its next operating cycle.

What is claimed is:

[1. Apparatus for determining the amount of location of imbalance in an article to be balanced about an axis thereof comprising means for receiving the article and for positioning its axis, a base, means for substantially freely movably supporting the article receiving means relative to said base, means for sensing the orientation of the article receiving means relative to the base and for producing at least one electrical output signal related to the sensed orientation, and means for applying a force to the article receiving means at at least one selected location about the axis to bring the article receiving means into a substantially neutral orientation, said force applying means being responsive to signals related to said electrical output signals for acting between the article receiving means and said base.]

[2. Apparatus according to claim 1 wherein the article receiving means comprises a table having an upwardly facing surface and a fixture for positioning the axis of the article at a preselected location on the table.]

[3. Apparatus according to claim 2 wherein the upwardly facing surface of the table is in a plane perpendicular to the direction of gravitational attraction when the table is in its neutral orientation with the centers of mass of the table and fixture lying along a line extending in the direction of gravitational attraction.]

[4. The invention of claim 1 wherein the article is to be balanced about an axis of rotation.]

[5. The invention of claim 4 wherein the receiving means comprises a chuck and spindle.]

[6. The invention of claim 1 wherein the means for sensing the orientation of the article receiving means comprises at least first and second indicator means for generating first and second signals representative of the orientation of the article receiving means relative to the base, the indicator means being positioned 90° apart about the axis, the article receiving means having a downwardly facing surface and the base having an upwardly facing surface, the indicator means being positioned between the downwardly facing surface and the upwardly facing surface.]

[7. The invention of claim 6 wherein the indicator means are equidistant from the axis.]

[8. The invention of claim 1 wherein the means for sensing the orientation of the article receiving means comprises four proximity transducers for generating four separate signals representative of the orientation of the article receiving means relative to the base, the four proximity transducers being positioned at 90° intervals about the axis.]

[9. The invention of claim 8 wherein the four proximity transducers are equidistant from the axis.]

[10. The invention of claim 1 wherein the force applying means comprises a first force coil apparatus for exerting a first and neutralizing force between the article receiving means and base to bring the article receiving means to the neutral position.]

[11. The invention of claim 1 wherein electric circuit means are provided for applying the force in response to the output signal of the orientation sensing means.]

[12. The invention of claim 11 wherein the orientation sensing means comprises at least first and second indicator means, the indicator means being spaced 90° apart about the axis.]

[13. The invention of claim 12 wherein the orientation sensing means comprises four proximity transducers spaced 90° apart about the axis and equidistantly therefrom.]

[14. Apparatus for determining the amount of location of imbalance in an article to be balanced about an axis thereof comprising means for receiving the article and for positioning its axis, a base, means for substantially freely movably supporting the article receiving means relative to said base, means for sensing the orientation of the article receiving means relative to the base, and means for applying a force to the article receiving means at at least one selected location about the axis to bring the article receiving means into a substantially neutral orientation, said force applying means acting between the article receiving means and said base, the force applying means comprising first and second force coils for exerting first and second neutralizing forces, respectively, between the article receiving means and base, the second force coil being positioned 90° away from the first force coil about the axis.]

[15. Apparatus for determining the amount and location of imbalance in an article to be balanced about an axis thereof comprising means for receiving the article and for positioning its axis, a base, means for substantially freely movably supporting the article receiving means relative to said base, means for sensing the orientation of the article receiving means relative to the base, and means for applying a force to the article receiving means at at least one selected location about the axis to bring the article receiving means into a substantially neutral orientation, said force applying means acting between the article receiving means and said base, the orientation sensing means comprising four proximity transducers spaced 90° apart about the axis and equidistantly therefrom, and the force applying means comprising first and second force coils responsive to the outputs of the proximity transducers for exerting first and second orienting forces, the first and second force coils being spaced 90° apart about the axis between the article receiving means and the base.]

[16. The invention of claim 15 wherein electric circuit means are provided for producing first and second force-representative outputs, the first and second force-representative outputs controlling current flow through the first and second force coils, respectively.]

[17. The invention of claim 16 and further comprising means for combining the first and second force-representative outputs to generate an output signal representative of a force at a selected angle with respect to a reference axis extending through the axis of the article.]

18. A method for determining the amount and location of imbalance in an article having an axis about which it is to be balanced comprising the steps of positioning the article on an article receiving means with the axis at a predetermined location thereon, applying at least first and second forces to the article receiving means at at least first and second locations about the axis to bring the article reveiving means into a neutral orientation, and determining the amount and location of the force required to bring the article receiving means into neutral orientation, the determining step comprising the steps of generating outputs representative of the amount and location of each applied force and combining these force-representative outputs into an output representative of a composite force at a single location, *the first and second forces being applied to the article receiving means substantially 90° apart about the axis at substantially equal distances from the axis, the step of combining the force-representative outputs comprises the steps of squaring the magnitudes of the first and second force-representative outputs, summing the squares of the magnitudes, taking the square root of the sum, determining which of the first and second force-representative outputs is smaller, and dividing the smaller force-representative output by the square root of the sum.*

[19. The method of claim 18 in which the first and second forces are applied to the article receiving means substantially 90° apart about the axis.]

[20. The method of claim 19 in which the first and second forces are applied at substantially equal distances from the axis.]

[21. The method of claim 20 in which the step of combining the force-representative outputs comprises the steps of squaring the magnitudes of the first and second force-representative outputs, summing the squares of the magnitudes, and taking the square root of the sum.]

[22. The method of claim 21 in which the step of combining the force-representative outputs comprises the steps of determining which of the first and second force-representative outputs is smaller and dividing the smaller force-representative output by the square root of the sum.]

23. The method of claim [22] *18* in which the step of combining the force-representative outputs comprises the steps of assigning signs to the directions in which the first and second forces are applied and comparing the signs to determine in which quadrant the location of imbalance lies.

24. The method of claim 23 in which the step of combining the force-representative outputs comprises the step of comparing the magnitudes of the first and second force-representative outputs to determine in which octant the location of imbalance lies.

25. The method of claim 18 and further comprising the steps of sensing the displacement of the article receiving means from its neutral orientation and producing at least first and second signals representative of this displacement, the first and second forces being applied in response to the first and second signals, respectively.

[26. A method for determining the amount and location of imbalance in an article which is to be balanced about an axis comprising the steps of positioning the article on an article receiving means with the axis at a predetermined location thereon, measuring the displacement of the article receiving means from a neutral orientation, generating at least first and second signals in response to such displacement, applying at least first and second forces to the article receiving means at at least first and second locations about the axis in response to the first and second signals, respectively, to bring the article receiving means to neutral orientation, and determining the amount and location of the force required to bring the article receiving means to neutral orientation, the determining step comprising the steps of generating signals representative of the amount and location of each applied force, combining the signals representative of the applied forces, and generating a signal representative of a signal composite force at a single location.]

[27. Apparatus comprising a base defining a generally vertically extending axis, a table, means for supporting the table for substantially free tilting movement about the axis relative to the base, means for indicating displacement of the table relative to the base, means for applying force to the table to hold it in a substantially neutral position, the indicating means and force applying means providing outputs representing, respectively, displacement and force, and means for computing the amount and location of imbalance of an article placed on the table, the computing means being connected to, and responsive to, the indicating means output.]

[28. Apparatus for determining the amount and location of imbalance in an article to be balanced about an axis thereof comprising a base, a table defining a vertical axis, the table holding the article and positioning the axis of the article to coincide with the table axis, means for supporting the table for substantially free tilting movement on the base, at least a pair for indicating the position of the table relative to the base, the indicating means having an electrical output representative of table displacement, the indicating means being spaced about the table axis, at least one means for applying a force to the table to hold the table in a substantially neutral orientation of the base, the force applying means having an electrical output representative of the force necessary to hold the table in the neutral position, and means for combining the displacement outputs of the indicating means to register the amount and location of the imbalance.]

*29. Apparatus for determining the amount and location of imbalance in an article having an axis about which it is to be balanced comprising means for receiving the article, means for positioning the article on the article receiving means with its axis at a predetermined location thereon, means for applying at least first and second forces to the article receiving means at at least first and second locations about the axis to bring the article receiving means into a neutral orientation, and means for determining the amount and location of the force required to bring the article receiving means into neutral orientation, the determining means comprising means for generating outputs representative of the amount and location of each applied force and means for combining these force-representative outputs into an output representative of a composite force at a single location, the first and second force-applying means being positioned substantially 90° apart about the axis at substantially equal distances from the axis, the means for combining the force-representative outputs including means for squaring the magnitudes of the first and second force-representative outputs, means for summing the squares of the magnitudes, means for taking the square root of the sum, means for determining which of the first and second force-representative outputs is smaller, and means for dividing the smaller force-representative output by the square root of the sum.*

*30. The apparatus of claim 29 in which the means for combining the force-representative outputs comprises means for assigning signals to the directions in which the first and second forces are applied and for comparing the signs to determine in which quadrant the location of imbalance lies.*

*31. The apparatus of claim 30 in which the means for combining the force-representative outputs comprises means for comparing the magnitudes of the first and second force-representative outputs to determine in which octant the location of imbalance lies.*

*32. The apparatus of claim 29 and further comprising means for sensing the displacement of the article receiving means from its neutral orientation and for producing at least first and second signals representative of this displacement, the first and second forces being applied in response to the first and second signals, respectively.*

*33. Apparatus for determining the amount and location of imbalance in an article having an axis about which it is to be balanced comprising means for receiving the article, means for positioning the article on the article receiving means with its axis at a predetermined location thereon, means for applying at least first and second forces to the article receiving means at at least first and second locations about the axis to bring the article receiving means into a neutral orientation, and means for determining the amount and location of the force required to bring the article receiving means into neutral orientation, the deter-*

*mining means comprising means for generating outputs representative of the amount and location of each applied force and means for combining these force-representative outputs into an output representative of a composite force at a single location, the first and second force-applying means being positioned substantially 90° apart about the axis at substantially equal distances from the axis, the means for combining the force-representative outputs including means for assigning signs to the directions in which the first and second forces are applied, means for comparing the signs to determine in which quadrant the location of imbalance lies and means for comparing the magnitudes of the first and second force-representative outputs to determine in which octant the location of imbalance lies.*

*34. The apparatus of claim 33 and further comprising means for sensing the displacement of the article receiving means from its neutral orientation and for producing at least first and second signals representative of this displacement, the first and second forces being applied in response to the first and second signals, respectively.*

*35. A method for determining the amount and location of imbalance in an article having an axis about which it is to be balanced comprising the steps of positioning the article on an article receiving means with the axis at a predetermined location thereon, applying at least first and second forces to the article receiving means at at least first and second locations about the axis to bring the article receiving means into a neutral orientation, and determining the amount and location of the force required to bring the article receiving means into neutral orientation, the determining step comprising the steps of generating outputs representative of the amount and location of each applied force and combining these force-representative outputs into an output representative of a composite force at a single location, the first and second forces being applied to the article receiving means substantially 90° apart about the axis at substantially equal distances from the axis, the step of combining the force-representative outputs comprising the steps of assigning signs to the directions in which the first and second forces are applied and comparing the signs to determine in which quadrant the location of imbalance lies, and the step of comparing the magnitudes of the first and second force-representative outputs to determine in which octant the location of imbalance lies.*

*36. The method of claim 35 and further comprising the step of sensing the displacement of the article receiving means from its neutral orientation and producing at least first and second signals representative of this displacement, the first and second forces being applied in response to the first and second signals, respectively.*

* * * * *

UNITED STATES PATENT AND TRADEMARK OFFICE

CERTIFICATE OF CORRECTION

PATENT NO. : Re. 31,120

DATED : January 11, 1983

INVENTOR(S) : Thomas J. Bacsanyi and Edward J. Harmon, deceased

It is certified that error appears in the above-identified patent and that said Letters Patent is hereby corrected as shown below:

Column 2, line 32, delete "proxmity" and insert --proximity-- therefor.

Column 5, line 60, delete "protect" and insert --project-- therefor.

Column 10, line 5, delete "a" and insert --the-- therefor.

Column 14, line 47, delete "reveiving" and insert --receiving-- therefor.

Column 16, line 3, after the word "pair" insert --of means--.

Column 16, line 43, delete "signals" and insert --signs-- therefor.

Signed and Sealed this

*Thirty-first* Day of *May 1983*

[SEAL]

*Attest:*

DONALD J. QUIGG

*Attesting Officer* *Acting Commissioner of Patents and Trademarks*